(12) United States Patent
Stiesdal

(10) Patent No.: US 9,698,653 B2
(45) Date of Patent: Jul. 4, 2017

(54) ELECTRICAL GENERATOR WITH DEDICATED COOLING OF STATOR SEGMENTS

(75) Inventor: Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 826 days.

(21) Appl. No.: 12/904,338

(22) Filed: Oct. 14, 2010

(65) Prior Publication Data

US 2011/0109095 A1    May 12, 2011

(30) Foreign Application Priority Data

Nov. 6, 2009    (EP) .................... 09013958

(51) Int. Cl.

| | |
|---|---|
| *H02K 9/19* | (2006.01) |
| *H02K 1/20* | (2006.01) |
| *F03D 9/25* | (2016.01) |
| *H02K 7/18* | (2006.01) |
| *H02K 1/16* | (2006.01) |

(52) U.S. Cl.
CPC .............. *H02K 9/19* (2013.01); *F03D 9/25* (2016.05); *H02K 1/20* (2013.01); *F05B 2260/201* (2013.01); *H02K 1/16* (2013.01); *H02K 7/1838* (2013.01); *H02K 2213/12* (2013.01); *Y02E 10/725* (2013.01); *Y02T 50/675* (2013.01)

(58) Field of Classification Search
CPC .................. H02K 9/00; H02K 9/19
USPC ...................... 310/58, 60 A, 52, 54
IPC .................................. H02K 9/00,9/19
See application file for complete search history.

(56) References Cited

U.S. PATENT DOCUMENTS

| | | | |
|---|---|---|---|
| 3,681,628 A | 8/1972 | Krastchew | |
| 3,704,078 A * | 11/1972 | Conery et al. ................ | 310/54 |
| 5,408,152 A * | 4/1995 | Finnerty et al. ............... | 310/54 |
| 5,473,207 A * | 12/1995 | Hopeck et al. ................ | 310/54 |
| 6,226,073 B1 * | 5/2001 | Emoto ....................... | 310/12.06 |
| 6,330,809 B1 * | 12/2001 | Boardman et al. ........... | 62/434 |
| 6,822,352 B2 | 11/2004 | Nimz et al. | |
| 6,856,053 B2 | 2/2005 | LeFlem et al. | |
| 7,545,060 B2 * | 6/2009 | Ward ............................ | 310/54 |
| 2002/0125788 A1 * | 9/2002 | Leijon et al. ................ | 310/259 |
| 2004/0012272 A1 * | 1/2004 | Houle et al. .................. | 310/54 |
| 2004/0113500 A1 * | 6/2004 | Casey et al. .................. | 310/58 |
| 2005/0082836 A1 * | 4/2005 | Lagerwey ...................... | 290/44 |
| 2007/0024132 A1 * | 2/2007 | Salamah et al. .............. | 310/64 |
| 2008/0067881 A1 * | 3/2008 | Winn ............................. | 310/52 |

(Continued)

FOREIGN PATENT DOCUMENTS

| | | |
|---|---|---|
| CN | 101517868 A | 8/2009 |
| DE | 19604643 A1 | 8/1997 |
| DE | 10103447 A1 | 8/2002 |

(Continued)

*Primary Examiner* — Michael Andrews

(57) ABSTRACT

The arrangement directed to a generator, which contains a rotor and a stator us disclosed. The stator contains at least two stator segments. At least one of the stator segments contains a number of stacked laminate plates. The stacked laminate plates contain a number of slots at a first side, while the first side of the stacked laminate plates is aligned to the rotor. The slots support a metal-winding of a stator coil. At least one hollow cooling-pipe is partly integrated into the stacked laminate plates of the stator segment to cool its laminate plates by a cooling-medium, which is located into the cooling-pipes.

14 Claims, 5 Drawing Sheets

(56) References Cited

U.S. PATENT DOCUMENTS

2009/0256431 A1    10/2009   Stiesdal
2009/0261668 A1    10/2009   Mantere

FOREIGN PATENT DOCUMENTS

| EP | 2182612 A1 | 5/2010 |
|----|-----------|--------|
| EP | 2320540 A1 | 5/2011 |
| JP | 2002255603 A | 9/2002 |
| WO | WO 9917422 A1 | 4/1999 |
| WO | WO 0106623 A1 | 1/2001 |
| WO | WO 02078150 A2 | 10/2002 |
| WO | WO 2006045772 A1 | 5/2006 |

\* cited by examiner

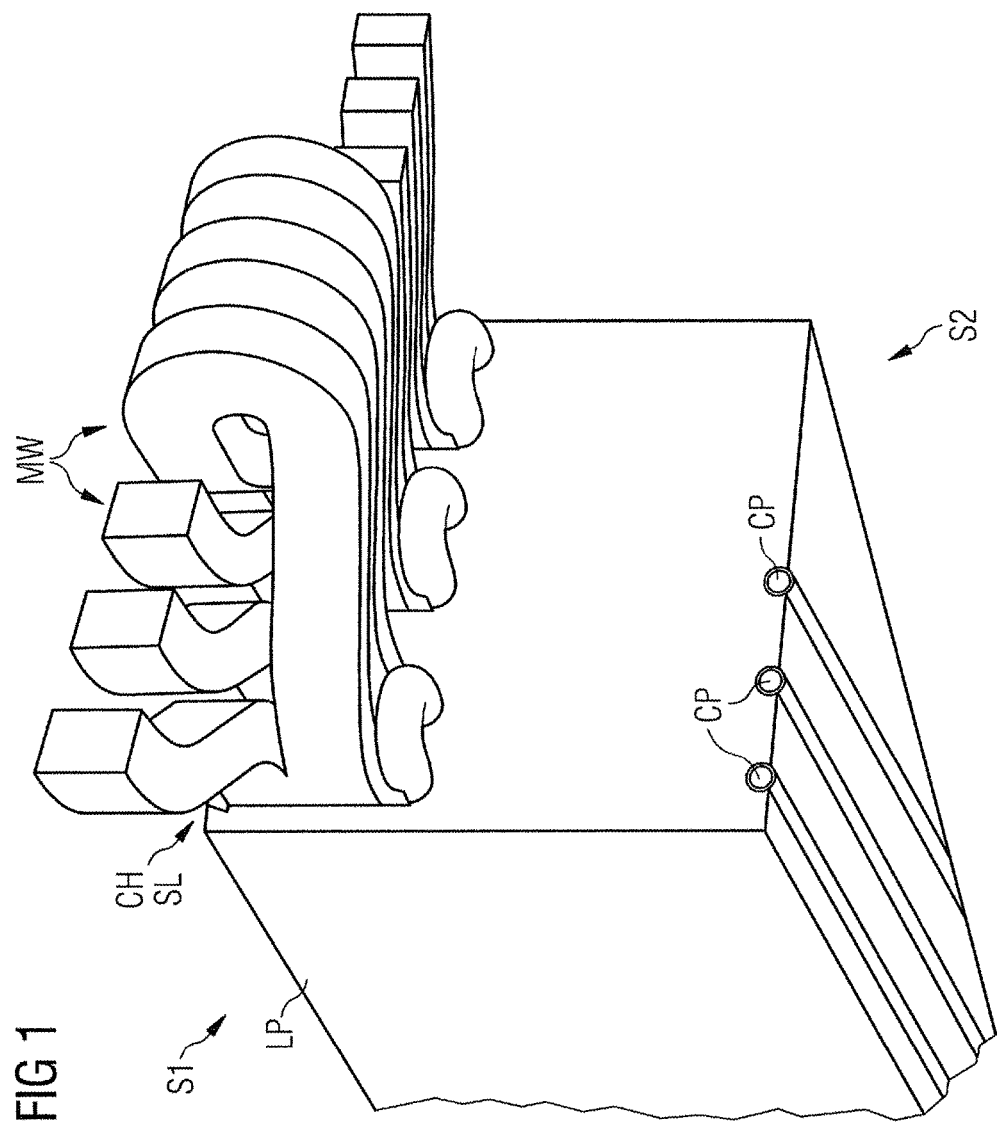

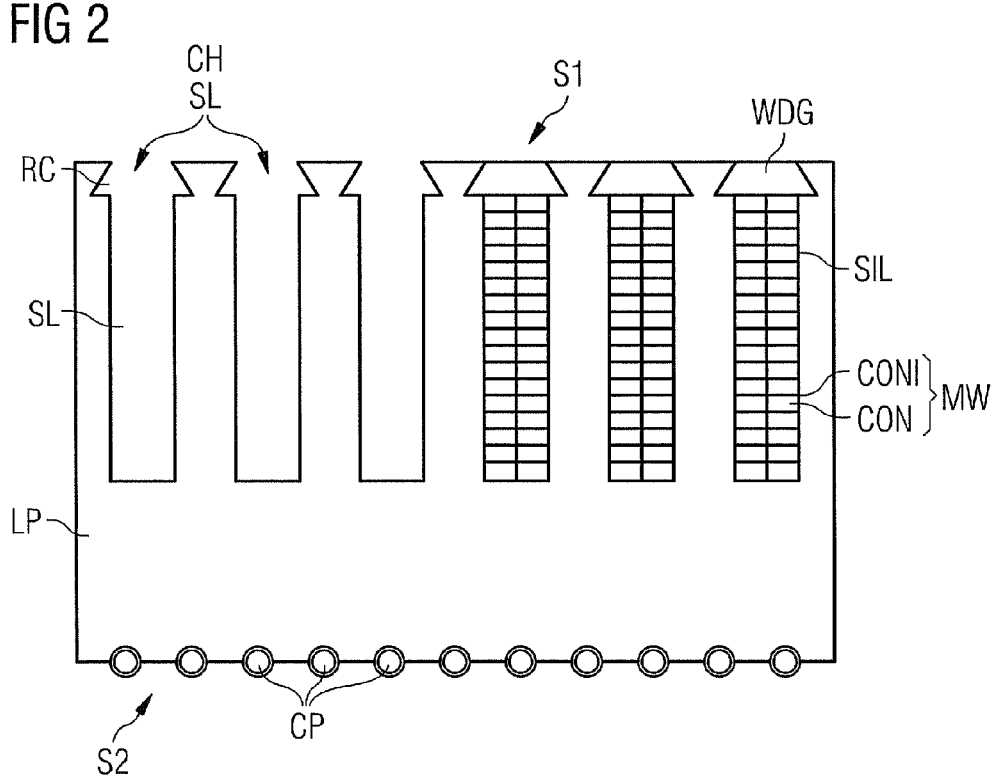
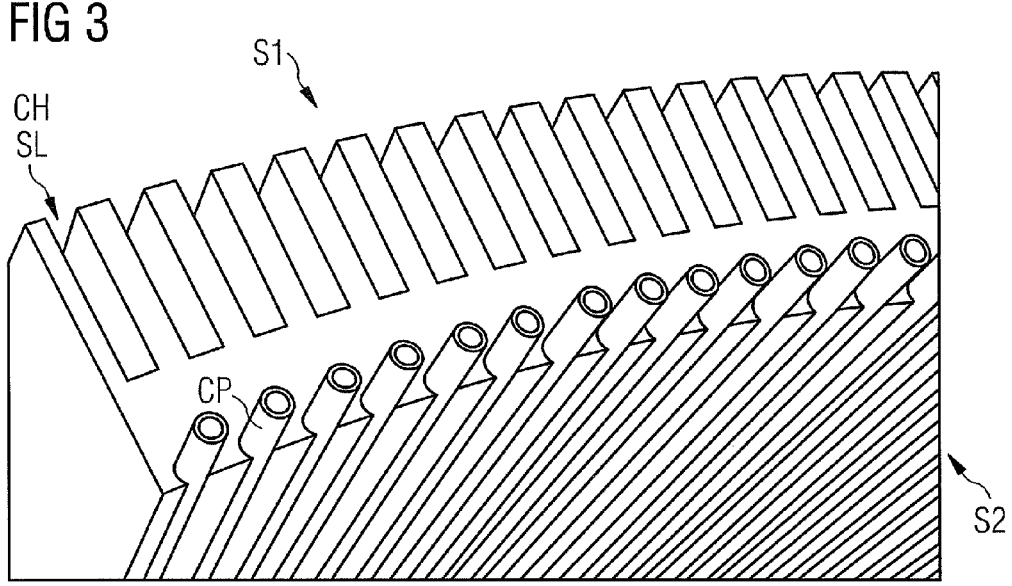

ELECTRICAL GENERATOR WITH DEDICATED COOLING OF STATOR SEGMENTS

CROSS REFERENCE TO RELATED APPLICATIONS

This application claims priority of European Patent Office application No. 09013958.5 EP filed Nov. 6, 2009, which is incorporated by reference herein in its entirety.

FIELD OF INVENTION

The invention relates to an arrangement for cooling of an electrical generator, to be used in a wind-turbine preferably.

BACKGROUND OF INVENTION

During the operation of a generator in a wind turbine magnetic fields are induced from a rotor. The rotor contains permanent magnets or wound poles, which induce the magnetic fields into stator-cores and stator-coils. This leads to induced currents, which generate significant heat in the stator-cores and stator-coils.

Additional eddy currents contribute to the generation of heat. Eddy currents are generated when a conductor is exposed to a changing magnetic field due to a relative motion of the conductor and the magnetic field force. Eddy currents are also generated due to variations of the magnetic field over time.

The eddy currents create magnetic fields, which opposes a desired magnetic field between stator components and rotor components. This results in a eddy current loss.

The eddy current loss may reach a significant level, especially for a large electrical machine like a direct drive generator in a wind turbine. Thus the efficiency of the rotor is reduced.

Furthermore the heat, which is generated by the eddy currents, leads to an increased temperature in the stator-components.

A typical stator contains stacked laminate plates, which are made of metal. The laminate plates are punched out from a sheet of iron, for example.

FIG. 9 shows the shape of a known laminate plate LP, which is part of a stator in a generator.

A first side S1 of the laminate plate LP is aimed to an air gap, which is between the stator and a rotor of the generator. At this first side S1 there are a number of slots SL.

The slots SL are punched out from the laminate plate LP preferably.

A number of laminate plates LP will be stacked, so the slots SL form channels CH within the stack of laminate plates LP. The channels CH support metal windings MW of a stator coil.

Each metal winding MW is formed by a conductor CON, which is surrounded by a conductor-isolation CONI. Each slot SL shows a slot isolation lining SIL to insulate the metal windings MW.

There is a recess RC on each top of the slot SL. The recess RC is constructed to support a wedge WDG. By the wedge WDG the metal windings MW inserted are kept in place.

Heat is generated if the electrical machine is at work. The heat is generated mainly by the metallic windings MW of the stator. Due to the heat the isolation of the metallic winding MW may be damaged, thus the temperature of the winding needs to be cooled down to achieve a predetermined lifetime of the electrical machine.

Various arrangement and methods are known to cool large electrical machines. A very common one is the circulation of a gaseous medium like air inside the electrical machine. This gaseous medium is kept cool by a heat exchanger, for example.

The drawback of this method is that large gas-to-air or gas-to-water heat exchangers are needed. Furthermore additional power is needed to circulate the cooling medium.

Another common method is to circulate a liquid coolant on the stator-side, which is not adjacent or facing to the air gap. Thus heat is transferred from the metallic winding by conduction to the laminate plates and from the laminate plates by conduction to the cooling medium.

The drawback of this method is that a considerable temperature gradient will exist between the stator winding and the cooling medium due to the moderate heat conductivity of the laminate iron. Thus it is difficult to maintain the temperature of the winding below a required maximum value.

Another common method is to introduce a liquid or gaseous medium in hollow copper bars. These bars are installed below the windings of the stator coil or they are connected with the rear side of the stacked laminate plates by welding. The copper bars exceed the channels of the laminate plates.

The drawback of this method is that numerous joints are needed—for the electrical connection and for the connection of the hollow copper bars. Therefore this method is only used in very large generators.

Another drawback is that the cooling pipes are exposed to the same electromagnetic fields as the coil-windings, thus voltages will be induced in the cooling pipes, which are made of metal.

Another method is known from document US 2005 0067 904 A. Here the stator laminate, made of iron, comprises C-shaped slots on the stator side, which points away from the rotor. Cooling tubes are inserted in said slots and the tubes are deformed to fit into the C-shaped channels.

The drawback of this method is that the deformation of the cooling tubes may lead to small cracks in the tubes. These cracks may enlarge over time, for example due to corrosion, environmental influences or material characteristics. Thus the cracks will result in leaks later.

Another drawback of this method is that the length of the cooling tubes increases if the method is used in large electrical machines. In this case the cooling tube is shaped like a long "serpentine". The cooling liquid is heated during its flow through the long serpentine. Thus the section of the stator, which contains the main part of the serpentine, will not be cooled sufficiently. Furthermore a temperature gradient will arise within the stator laminate, made of iron for example.

SUMMARY OF INVENTION

It is therefore the aim of the present invention, to provide an improved cooling arrangement for an electrical generator, especially for a large electrical generator like a direct drive generator in a wind turbine.

This aim is achieved by the features of the independent claims. Further configurations of the invention are subject of the dependent claims.

The arrangement invented relates to a generator, which contains a rotor and a stator. The stator contains at least two stator segments. At least one of the stator segments contains a number of stacked laminate plates. The stacked laminate plates contain a number of slots at a first side, while the first side of the stacked laminate plates is aligned to the rotor. The slots support a metal-winding of an stator coil. At least one hollow cooling-pipe is partly integrated into the stacked laminate plates of the stator segment to cool its laminate plates by a cooling-medium, which is located into the cooling-pipes.

The stator is partitioned into segments. Preferably the partly integrated cooling pipe is designed in a way that an exchange of at least one stator segments together with the dedicated cooling pipe is allowed.

As a major part of the surface of the cooling pipe is integrated in the stator the surface of the cooling-pipe is in close contact with the stator segment. Thus the heat transfer is increased. This ensures an optimal cooling of the dedicated segment.

Eddy currents in the stator segment are eliminated around the cooling pipe due to the location of the cooling pipe and due to the material used for the cooling pipe.

Due to the reduced or eliminated eddy currents less heat is produced.

Preferably the partly integrated cooling-pipe penetrates the stacked laminate plates on a second side, which is opposite to the first side. Thus the cooling-pipe is in close contact with the stator segment to improve the cooling.

Preferably the cooling-pipe is filled with a cooling medium, while the cooling-pipe is part of a cooling system. Thus the cooling medium is used for an active cooling of the stator segment.

Preferably the cooling-pipe is filled with a liquid cooling like water for example. Preferably water is used while anti-freeze agents or oil may be added to the water.

Anti-freeze agents are ethylene glycol, diethylene glycol or propylene glycol for example. Mineral oil, silicone oil or fluorocarbon oil may be used as oils for example. Thus a suitable liquid cooling-medium may be used to ensure a desired cooling range.

Preferably the cooling medium enters the cooling-pipe at separate "cold" input and exits at separate "hot" output of the cooling pipe. Thus the cooling of the stator can be controlled by the fixed flow of the cooling medium.

Preferably each stator segment comprises at least one cooling-pipe, while each cooling pipe contains a separate cold input and a separate hot output.

Preferably the generator comprises one common cooling means, like a heat exchanger for example. Each cold input and each hot output of all needed cooling pipes are connected to this common heat exchanger. Due to this short connection-lines are created between the cooling-pipes and the heat exchanger, thus an improved cooling of the generator is ensured.

The cooling of an individual stator-segment is not influenced by the cooling of other stator-segments. Thus a more uniform and efficient cooling of each single segment is achieved.

Preferably the generator contains two or more cooling means, like heat exchangers for example. Each separate cooling means is connected to a dedicated stator-segment via the input/output of the cooling-tube. Thus an improved cooling of the dedicated segment is achieved.

Furthermore the cooling is divided into a number of smaller cooling units, thus the mechanical complexity is decreased.

Preferably the cooling-pipe is made of a non-magnetic material. As the cooling pipe(s) does not form part of magnetic pathways inside the laminate plates the production of heat is reduced, too.

Preferably the cooling-pipe is made of metal. Thus it can be used for an efficient heat transfer from the laminate plates to the cooling medium.

Preferably the cooling-pipe is made of stainless steel. Thus the cooling pipes are very robust and corrosion is avoided. Thus a long lifetime of the whole generator is ensured.

Preferably a heat transfer compound is arranged between said cooling-pipe and said stacked laminate plates. Thus a maximal heat-transfer between the laminate plates and the cooling system is ensured.

Preferably the cooling-pipe show a number of hairpin bends, which are placed in slots or channels of the stacked laminate plates. They are designed and constructed in a way that voltages, which are induced into the cooling pipes by the revolving rotor, are reduced.

Thus only a minimum of excessive heat is induced in the cooling pipes.

Preferably the cooling-pipe is part of a structure, which is used to support elements of the stator segment. Thus the means for mechanical construction and support are reduced.

Especially the laminate plates are fixed by help of the cooling-pipes.

Furthermore a close physical and/or thermal connection between the structures is ensured, to optimize the heat-transfer.

Preferably the cooling-pipe contains threaded portions on the pipe. They are used to apply bolts to tighten sides of the stator. This is an effective method of tightening the stator laminate plates together and also ensures that the bolts can be re-tightened is needed.

Preferably the cooling-pipe contains one or more supporting flanges, which are connected by welding on the said pipe for example. Thus the support structure can be build up during the manufacture of the machine.

BRIEF DESCRIPTION OF THE DRAWINGS

The invention is described in more detail now by the help of the figures. The figures show examples and therefore do not limit the scope of the arrangement invented.

FIG. 1 shows a part of the cooling-arrangement invented,

FIG. 2 shows a laminate plate according to the invention in a side-view,

FIG. 3 shows in reference to FIG. 1 and FIG. 2 a 3D-view of a part of the arrangement invented.

DETAILED DESCRIPTION OF INVENTION

FIG. 1 shows a part of the cooling-arrangement invented, A number of laminate plates LP are stacked. Each laminate plate LP shows a number of slots SL. Because of the stacking the slots SL form a number of channels CH, which are used to support metal-windings MW of a stator-coil.

The stacked laminate plates LP are part of stator-segment. The stacked laminate plates LP show a first side S1, which is aligned to the rotor of the generator. The slots SL are located on this first side S1.

At least one cooling-pipe CP is partly integrated into the stacked laminate plates LP. The partly integrated cooling-pipes CP penetrate the laminate plates LP on a second side S2 of the stacked laminate plates LP. The second side S2 is opposite to the first side S1.

A heat transfer compound (not shown here) is arranged between the cooling-pipe CP and the stacked laminate plates LP. Thus the thermal conductivity of the thermal interface between irregular surfaces of the stacked laminate plates and the cooling-pipes is enhanced. Air gaps between the components are reduced or even eliminated, thus the cooling is improved.

The compound may be ceramic, metal, carbon or a liquid.

FIG. 2 shows a laminate plate LP according to the invention in a side-view.

A first side S1 of the laminate plate LP is aligned or aimed to an air gap, while the air gap is between the stator and the rotor of the generator. The first side S1 contains a number of slots SL. The slots SL may be punched out from a sheet of metal. The laminate plate LP may be manufactured by the same way.

With reference to FIG. 1 a number of stacked laminate plates LP will form channels CH due to the slots SL. This channels CH are used to support the metal windings MW of the stator-coil.

Each metal winding MW is formed by a conductor CON, which is surrounded by a conductor-isolation CONI. Each slot SL shows a slot isolation lining SIL to insulate the bundle of metal windings MW.

On top of each slot SL there is a recess RC. The recess RC is built to support a wedge WDG. When the metal windings MW of the electrical coils are inserted they are kept in place by help of the wedge WDG.

A number of cooling-pipes CP is partly integrated into the (stacked) laminate plates LP and on the second side S2, which is opposite to the first side S1.

Preferably the cross-section of the cooling-pipes CP is integrated by more than 50% into the (stacked) laminate-plates LP.

This FIG. 2 shows only a part of the stator segment, which comprises the stacked laminate plates. The stacked laminate plates are shaped circular.

FIG. 3 shows in reference to FIG. 1 and FIG. 2 a 3D-view of a part of the arrangement invented.

Figure 4:
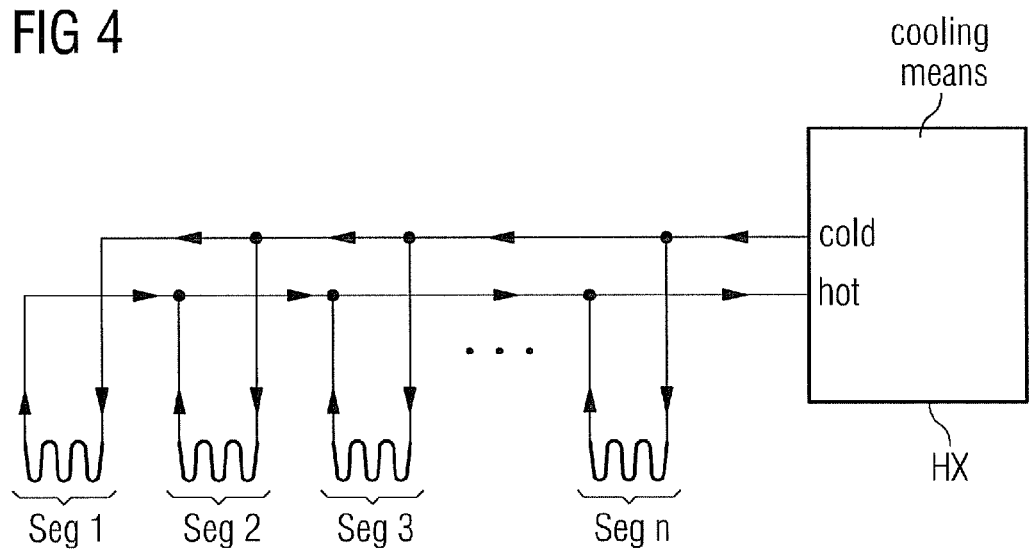
FIG. 4 illustrates schematically a first preferred configuration according to the invention.

FIG. 4 illustrates schematically a first preferred configuration according to the invention.

The generator (not shown here) contains a common cooling means like a heat exchanger HX for example.

The common heat exchanger HX is connected to four segments seg1, seg2, seg3 and seg4 of the segmented stator of the generator.

Each of the segments seg1 to seg4 shows a "cool" input and a "hot" output of the dedicated cooling-pipe, which are connected appropriate as shown here. Thus long connection-lines between the stator-segments seg1 to seg4 and the heat exchanger HX are avoided.

The cooling-medium is divided and brought into four cooling-paths, each cooling path is dedicated to one of the segments seg1 to seg4.

The divided cooling medium is combined after it leaved the dedicated cooling-path.

Seen from the heat exchanger FIX the cooling-pipes are regarded to be parallel coupled.

Figure 5:
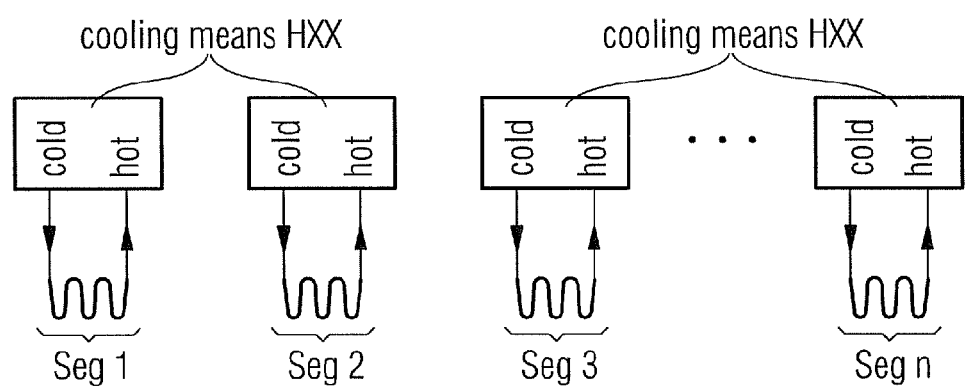
FIG. 5 illustrates schematically a second preferred configuration according to the invention.

FIG. 5 illustrates schematically a second preferred configuration according to the invention.

The generator (not shown here) contains a number of four cooling means like heat exchangers HXX for example.

Each heat exchanger HXX is connected to a dedicated segment seg1, seg2, seg3 and seg4 of the segmented stator of the generator.

Thus a number of four independent cooling-circuits are built, while each circuit contains a cooling-pipe of one of the segments seg1 to seg4.

Preferably the cooling system according to FIG. 1 and according to FIG. 5 may be combined.

As an example if the stator is partitioned into 8 segments, the cooling-system may comprise two cooling means. Each of the cooling means may supply and receive cooling medium from the cooling pipes of 4 stator segments.

Figure 6:
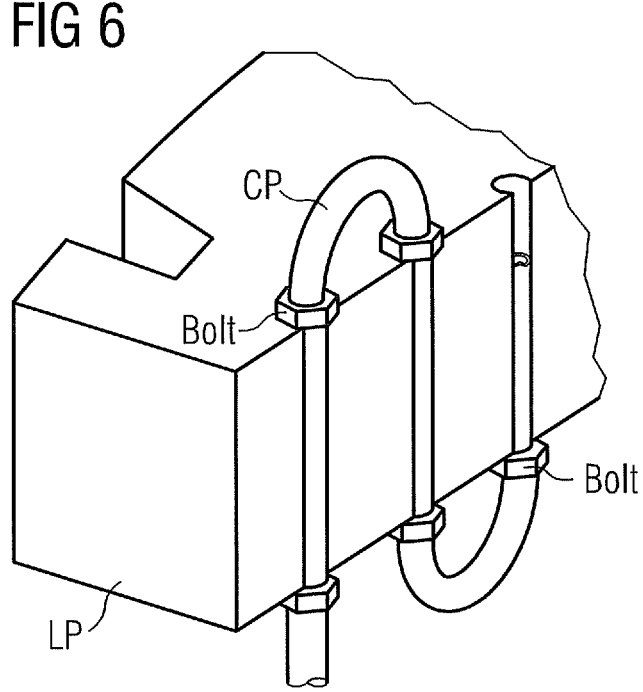
FIG. 6 and FIG. 7 show stacked laminate plates, which are fixed by help of the cooling-pipe, to be used in the arrangement invented.
Figure 7:
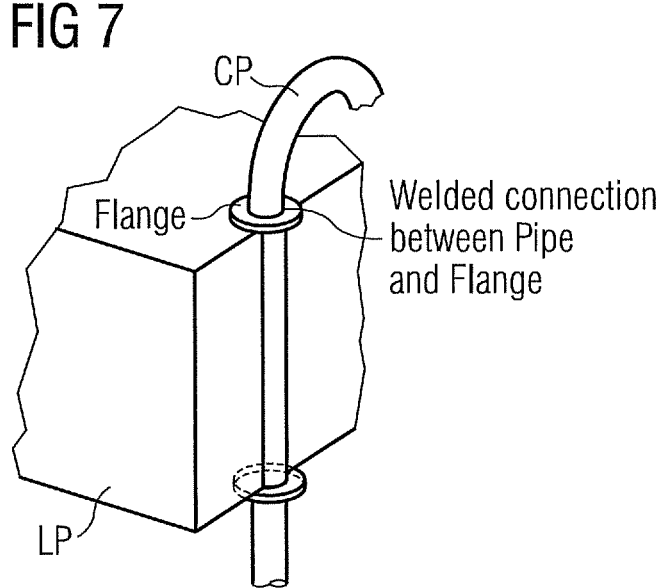
Figure 8A:
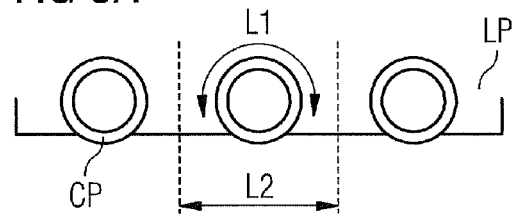
FIG. 8 illustrates the position of cooling-pipes CP in view of the laminate plates.

FIG. 6 and FIG. 7 show stacked laminate plates LP, which are fixed by help of the cooling-pipe CP, to be used in the arrangement invented, FIG. 8A illustrates schematically cooling-pipes CP, which are arranged in slots SL of the laminate plates LP according to the invention.

Figure 8B:
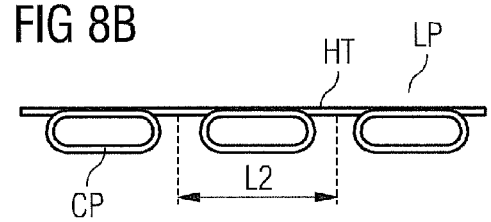
Figure 9:
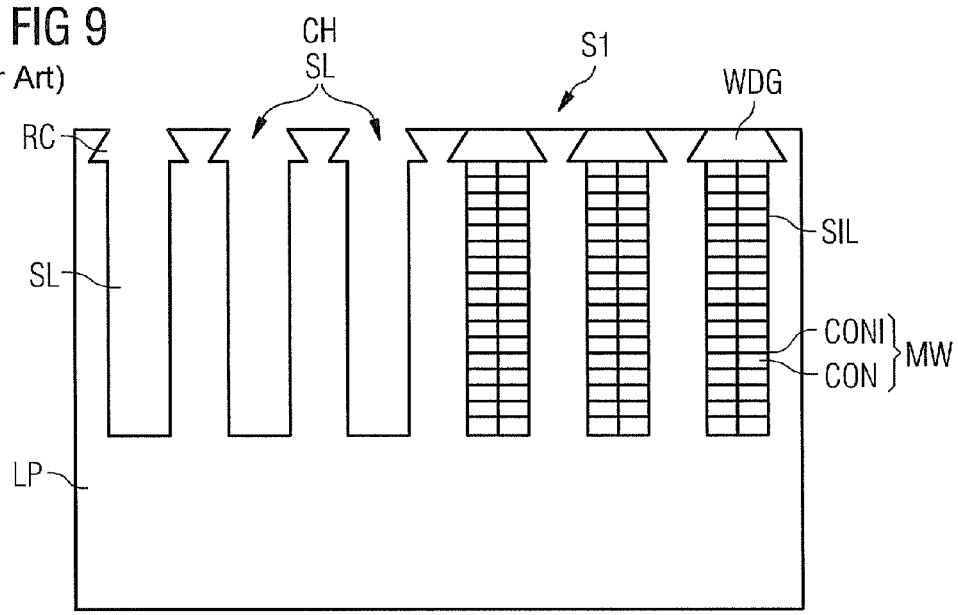
FIG. 9 shows a known laminate plate as described in the introduction.

FIG. 8B illustrates schematically cooling-pipes CP, which are mounted on a surface of the laminate plates LP. This configuration is known before.

According to FIG. 8A the cooling-pipes CP are integrated part of the laminate plates LP. The cooling-pipe CP contains an inner perimeter with a length L1.

The length L2 represents the distance between two adjacent cooling pipes CP. As shown here the perimeter length L1 is substantial equal to the length L2.

According to FIG. 8B the cooling pipes CP are no integrated part of the laminate plates LP, they are located on heat transferring plates HT substantially on the inner surface of the stator. The maximum width of the plates HT is equal to the distance of L2.

The illustration in FIG. 8A show an improved cooling efficiency compared to the illustration in FIG. 8B.

The invention claimed is:

1. A wind turbine electrical generator cooling arrangement, comprising:
   a rotor;
   a stator including a plurality of stator segments, each stator segment including a plurality of stacked-laminate plates, the plurality of stacked-laminate plates contain a plurality of slots at a first side of the plurality of stacked-laminate plates, the first side of the plurality of stacked-laminate plates is aligned to the rotor and the plurality of slots support a metal-winding of a stator coil;
   a plurality of hollow-cooling pipes, each of the plurality of hollow-cooling pipes is dedicated to one of the plurality of stator segments and each of the plurality of hollow-cooling pipes is partly integrated into the plurality of stacked-laminate plates of the dedicated stator segment in order to cool the plurality of stacked-laminate plates by a cooling-medium, which is located in each hollow-cooling pipe; and
   a plurality of heat exchangers, each of the plurality of heat exchangers is connected with only one of the plurality of hollow-cooling pipes of the dedicated stator segment by a respective input-connection and an output connection;
   wherein each partly integrated cooling pipe is disposed such that a thermal exchange between the dedicated stator segment and the cooling pipe is allowed, wherein each partly integrated hollow-cooling pipe is located on a second side of the plurality of stacked-laminate plates,
wherein the second side is opposite to the first side, and
wherein each partly integrated cooling pipe is exposed from the plurality of stacked-laminate plates along the second side in a longitudinal direction, wherein each partly integrated cooling pipe is partly integrated into the plurality of stacked-laminate plates along a longitudinal direction.

2. The arrangement according to claim 1,
wherein each cooling pipe contains the input connection and the output connection for the cooling-medium, and
wherein the cooling medium enters each hollow-cooling pipe via the input connection with a first temperature and while the cooling medium leaves each hollow-cooling pipe via the output connection with a second temperature, which is warmer than the first temperature.

3. The arrangement according to claim 1,
wherein a heat transfer compound is arranged between each cooling pipe and the plurality of stacked-laminate plates of the dedicated stator segment.

4. The arrangement according to claim 1,
wherein each hollow-cooling pipe contains a plurality of hairpin bends, which are shaped and arranged in the dedicated stator segment such that voltages induced in each hollow-cooling pipe are reduced.

5. The arrangement according to claim 1,
wherein each hollow-cooling pipe is part of a support-structure, which is constructed to support the laminate plates of the of dedicated stator segment.

6. The arrangement according to claim 1,
wherein each hollow-cooling pipe contains threads, which are constructed to tighten at least the stacked-laminate plates.

7. The arrangement according to claim 6,
wherein each hollow-cooling pipe contains a supporting flange;
and wherein the supporting flange is welded to each hollow-cooling pipe.

8. The arrangement according to claim 1,
wherein the generator contains an outer-rotor and an inner-stator, or
wherein the generator is a direct drive generator of a wind-turbine.

9. The arrangement according to claim 1,
wherein the cooling medium is liquid.

10. The arrangement according to claim 9,
wherein the cooling medium comprises an anti-freeze agent or oil.

11. The arrangement according to claim 1,
wherein the cooling medium comprises an anti-freeze agent or oil.

12. The arrangement according to claim 1,
wherein each hollow-cooling pipe is made of a non-magnetic material;
and wherein each hollow-cooling pipe is made of stainless-steel.

13. The arrangement according to claim 1,
each hollow-cooling pipe extends axially along a longitudinal direction of the laminate.

14. The arrangement according to claim 1,
wherein the stator and the rotor are extend circumferentially about a common axis.

\* \* \* \* \*